United States Patent [19]
Kinoshita et al.

[11] Patent Number: 5,644,084
[45] Date of Patent: Jul. 1, 1997

[54] METHOD OF MEASURING NATURAL FREQUENCY OF MOTOR

[75] Inventors: Shinji Kinoshita; Mitsuru Ide; Koichi Katakura, all of Nagano, Japan

[73] Assignee: Kabushiki Kaisha Sankyo Seiki Seisakusho, Nagano, Japan

[21] Appl. No.: 429,547

[22] Filed: Apr. 27, 1995

[30] Foreign Application Priority Data

Apr. 27, 1994 [JP] Japan ................... 6-111962

[51] Int. Cl.$^6$ ................... G01H 13/00
[52] U.S. Cl. ................... 73/579; 73/593
[58] Field of Search ................... 73/576, 579, 580, 73/581, 582, 583, 593

[56] References Cited

U.S. PATENT DOCUMENTS

| | | | |
|---|---|---|---|
| 3,411,344 | 11/1968 | Lloyd | 73/579 |
| 3,726,129 | 4/1973 | Thorne | 73/579 |
| 4,078,434 | 3/1978 | Weberhofer | 73/579 |
| 4,389,891 | 6/1983 | Fournier | 73/579 |
| 5,257,544 | 11/1993 | Khuri-Yakub et al. | 73/593 |
| 5,263,372 | 11/1993 | Mastuzaki et al. | 73/593 |
| 5,495,763 | 3/1996 | Rhodes et al. | 73/579 |

*Primary Examiner*—Richard Chilcot
*Assistant Examiner*—Max H. Noori
*Attorney, Agent, or Firm*—Sughrue, Mion, Zinn, Macpeak & Seas

[57] ABSTRACT

A current feed means is connected to an armature coil of a motor. Current is fed from the current feed means to the armature coil while the frequency of the current is gradually varied from a preset frequency to another preset frequency, thereby to vibrate the motor. The amplitudes of the frequencies are measured by a frequency analyzer means, which is brought into contact with the motor. The frequency at which the amplitude of the vibration of the motor is peaked indicates the natural frequency of the motor.

12 Claims, 2 Drawing Sheets

METHOD OF MEASURING NATURAL FREQUENCY OF MOTOR

BACKGROUND OF THE INVENTION

1. Field of the Invention

The present invention relates to a method of measuring a natural frequency of a motor. The measuring method is applicable to, for example, a case where check is made as to if a prepressure that is applied in advance to the ball bearings therein is a preset value.

2. Related Art

In some of the conventional motors, the ball bearings are used for rotatably supporting a rotor by a stator. In this type of the motor, a load (a proper load determined substantially by the ball bearings) is applied to the ball bearings in a given direction in order to secure an accurate positioning in the radial and axial directions, to suppress a swing, to increase a rigidity of the ball bearings, and to improve an accuracy of the rotation by stabilizing the path of the ball bearings.

Such a mounting way is called a prepressure. The prepressure is categorized into a fixed position prepressure in which a relative position of the ball bearing in the axial direction is invariable even when it is used, and a fixed pressure prepressure in which the quantity of the prepressure can be kept substantially constant by making use of an elastic member, such as a coiled spring, even if a relative position of the ball bearing in the axial direction is varied, even when it is used.

In the fixed position pressure, the inner ring and the outer ring of the ball bearing are both fixed by adhesive. In the fixed pressure prepressure, either of the inner ring or the outer ring of the ball bearing is not fixed, or slidable.

A insufficient quantity of the prepressure applied to the ball bearing causes a play in the rotor. An excessive quantity of the prepressure causes an overheat, increase of a friction moment, reduction of fatigue life, and other problems.

Therefore, the quantity of the prepressure applied to the ball bearing must be selected to be proper in consideration of use conditions, the purpose of the prepressure, and the like.

For this reason, it is necessary to check as to if a preset prepressure is applied to the ball bearing. Some methods of the check are known.

1) In a first check method, a motor is vibrated and a natural frequency of the motor is measured. In this method, when a measured natural frequency is higher than a preset one, it is considered that the quantity of the prepressure is larger than desired. When the former is lower than the latter, it is considered that the quantity of the prepressure is smaller than desired.

2) In a second check method, a current value for driving a motor is measured. When a measured current value is larger than a preset one, it is considered that the prepressure is higher than desired. When the measured current value is smaller, it is considered that the prepressure is smaller than desired.

3) In a third check method, after the motor is driven, the feed of current is ceased, and a time period where the motor stops is measured. When a measured motor-stop period of time is shorter than a preset one, it is considered that the quantity of the prepressure is larger than desired. When the motor-stop time period is longer, it is considered that the quantity of the prepressure is smaller than desired.

In the first check method in which a natural frequency of the motor is measured, and the prepressure to the ball bearing is checked, to vibrate the motor, the motor is hit with a hammer or set to a vibrator machine.

When the motor is hit with a hammer, the motor may be damaged and the ball bearing contained therein may also be damaged.

Where the vibrator machine is used for vibrating the motor, the machine must be installed, leading to increase of cost.

SUMMARY OF THE INVENTION

With the view of overcoming the disadvantages of the conventional art, an object of the present invention is to provide a method of measuring a natural frequency of the motor, which is realized at low cost, and capable of checking a prepressure to the ball bearings without damaging the motor and the ball bearings contained therein.

There is provided that a method of measuring a natural frequency of a motor with ball bearings, comprising the steps of: connecting current applying means to an armature coil of the motor; applying a current from the current feed means to the armature coil while the frequency of the current is gradually varied from a preset frequency to another preset frequency, to vibrate the motor: and measuring the amplitudes corresponding to the frequencies of the current by a frequency analyzer means, which is brought into contact with the motor.

According to the present invention, a current feed means is connected to an armature coil of a motor. To vibrate the motor, current is fed to the armature coil while the frequency of the current is gradually varied from a preset frequency to another preset frequency. The natural frequency of the motor is measured by a frequency analyzer means brought into contact with the motor. Therefore, there is no need of hitting the motor with a hammer or using a vibrator machine. The motor per se and the like do not suffer from damage. The arrangement of the oscillator and the frequency analyzer is simpler than the vibrator machine, leading to cost reduction. in the present invention, a current feed means is connected to an armature coil of a motor. To vibrate the motor, current is fed to the armature coil while the frequency of the current is gradually varied from a preset frequency to another preset frequency.

DETAILED DESCRIPTION OF THE PREFERRED EMBODIMENTS

The magnetic disk driving motor of the present invention will be described in detail in the following with reference to the accompanying drawings.

Figure 4:
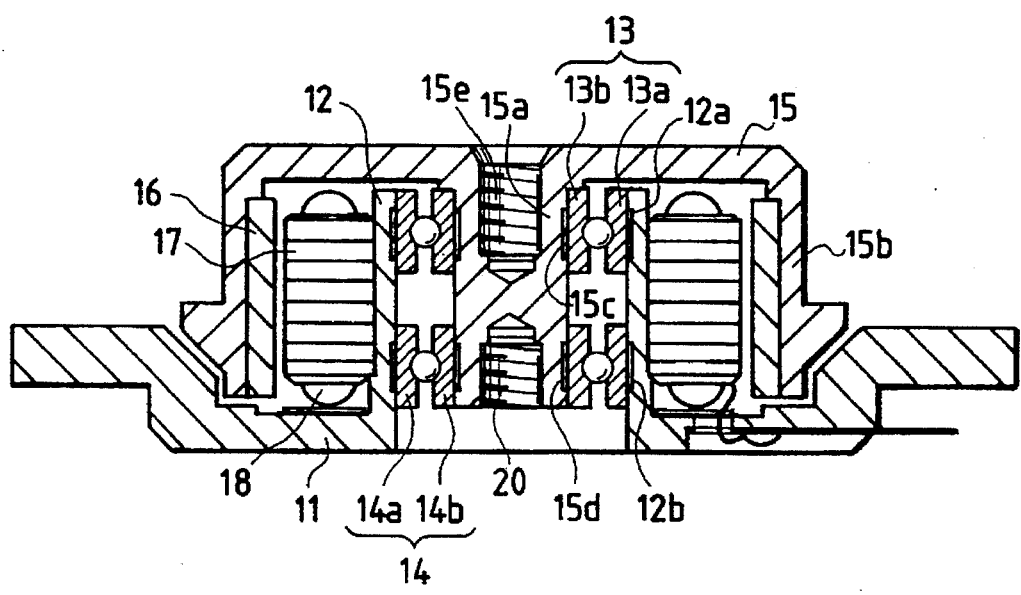
FIG. 4 is a longitudinal sectional view showing an overall construction of the motor.

Referring to FIG. 4, a cylindrical holder 12 is integrally mounted generally at the central portion of a motor frame 11 so that it protrudes upward in the drawing. In the holder 12, a pair of ball bearing 13 and 14 are arranged at an axially predetermined spacing.

Incidentally, the cylindrical holder 12 may be made of a separate member and fixed generally at the central portion of the motor frame 11.

The paired ball bearings 13 and 14 have their inner races 13b and 14b rotatably bearing a shaft 15a which is formed in a hub 15 serving as a rotor case, described below, for supporting it. The holder 12 is formed in its inner circumference with annular grooves 12a and 12b which are to be filled with an adhesive for fixing the outer races 13a and 14a of the paired ball bearings 13 and 14. The inner circumference of the holder 12 is made straight without any roughness except for the grooves 12a and 12b.

Similarly, the shaft 15a is formed in its outer circumference with annular grooves 15c and 15d which are to be filled with an adhesive for fixing the inner races 13b and 14b of the paired ball bearings 13 and 14. The outer circumference of the shaft 15a is made straight without any roughness except for the grooves 15a and 15d. Incidentally, annular grooves 12a, 12b, 15c and 15d for being filled with adhesive are provided to ensure the fixing the inner races and need not be formed.

Moreover, the shaft 15a is formed in its shown lower end portion with an internally threaded bore 20 which acts as an engagement portion to be used for applying the pre-pressure to the paired ball bearings 13 and 14.

In the embodiment, the shown upper end portion of the engagement portion is formed with an internally threaded bore 15e. This threaded bore 15e is used to clamp a plurality of magnetic disks (not shown) by means of a screw after the magnetic disk driving motor has been loaded with the magnetic disks.

On the other hand, the hub 15 serving as the rotor case is formed at its shown upper end portion with a cylindrical flange portion 15b which surrounds the shaft 15a for supporting the hub 15. This flange portion 15b is loaded on its outer circumferential wall with the plurality of magnetic disks (not shown). An annular drive magnet 16 is fixed in the inner circumference of the flange portion 15b. On the outer circumference of the holder 12 at the side of the motor frame 11, there is fixed a stator core 17 which has its individual projecting poles wound with core windings 18. The aforementioned drive magnet 16 is arranged to face the core windings 18.

Thus, by magnetizing these core windings 18, the drive magnet 16 is spun so that both the hub 15 made rotatable with the drive magnet 16 and the (not-shown) magnetic disks mounted on the outer circumferential wall of the flange portion 15b (of the hub 15) are rotationally driven or spun. The driving motor to be used for spinning the magnetic disks in accordance with this embodiment is assembled in the following manner.

First of all, a stator assembly is made. Specifically, the stator cores 17 and the core windings 18 formed on the individual projecting poles of the stator cores are assembled on the outer circumference of the cylindrical holder 12 at the side of the motor framed 11.

Then, the paired ball bearings 13 and 14 are press fitted and adhered to or inserted and adhered to the inner circumference of the holder 12, and the individual outer races 13a and 14a of the paired ball bearings 13 and 14 are fixed on an inner circumferential wall of the holder 12 such as is formed with the annular grooves 12a and 12b for filling with adhesive. Thus, the stator assembly is completed.

Next, the hub assembly Is made by fixing the annular drive magnet 16 on the inner circumferential wall of the flange portion 15b of the hub 15.

Figure 3:
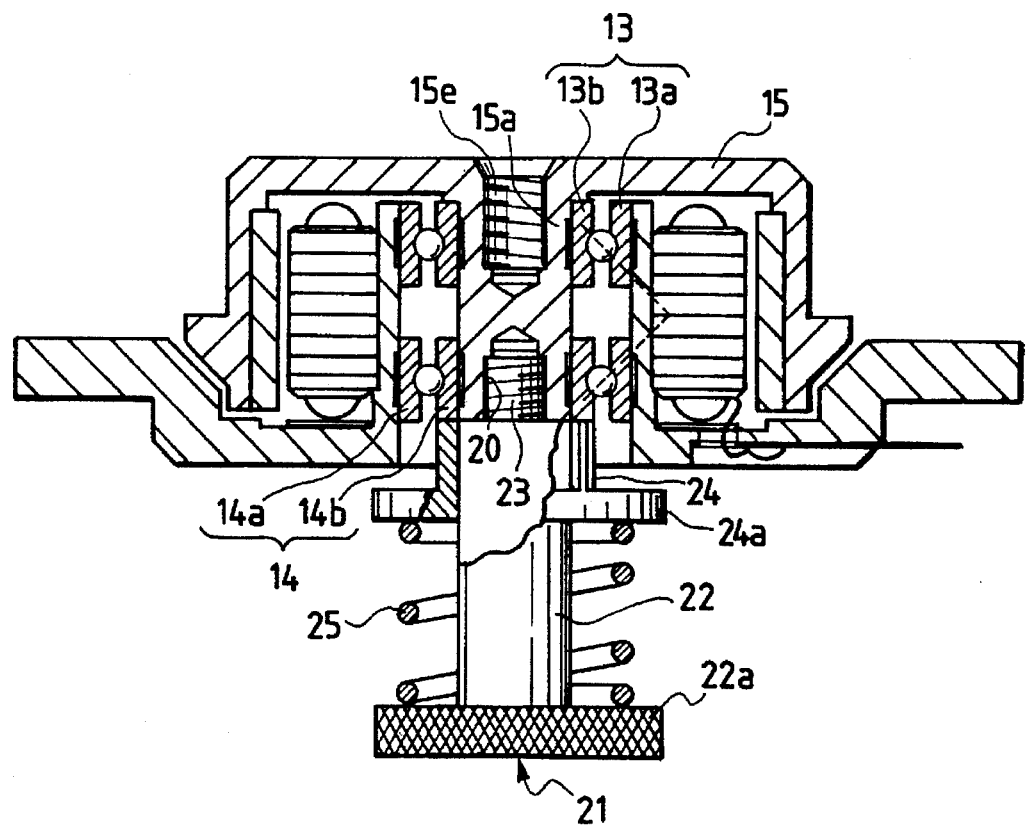
FIG. 3 is a longitudinal sectional view showing a process for applying a prepressure to a motor according to the present invention.

Then, the magnetic disk driving motor is assembled by inserting the aforementioned hub assembly downward, as seen in FIG. 3, into the aforementioned stator assembly.

Specifically, the shaft 15a of the hub 15 is inserted or press-fitted into the individual inner races 13b and 14b of the paired ball bearings 13 and 14, as shown in FIG. 3, until it is adhered. At this time, the paired ball bearings 13 and 14 are fixed under the pre-pressure on the shaft 15a, as has been described above.

The application of the pre-pressure is accomplished by using a pre-pressure FIG. 21 shown in FIG. 3.

The pre-pressure FIG. 21 is formed in a front end (or a shown upper end portion) of its body drum 22, with a externally threaded portion 23 for engaging (or screwing) with the internally threaded bore 20 which is formed in the shaft 15a to act as the engagement portion. This externally threaded portion 23 is formed on its outer circumference with a generally cylindrical pressure member 24 which is made axially slidable with respect to the threaded portion 23. This pressure member 24 is in abutment, at its end face (or its shown upper end face) at the side of the threaded portion 23, against the end face (or the shown lower end face) of the inner race 14b of the ball bearing 14.

Figure 1:
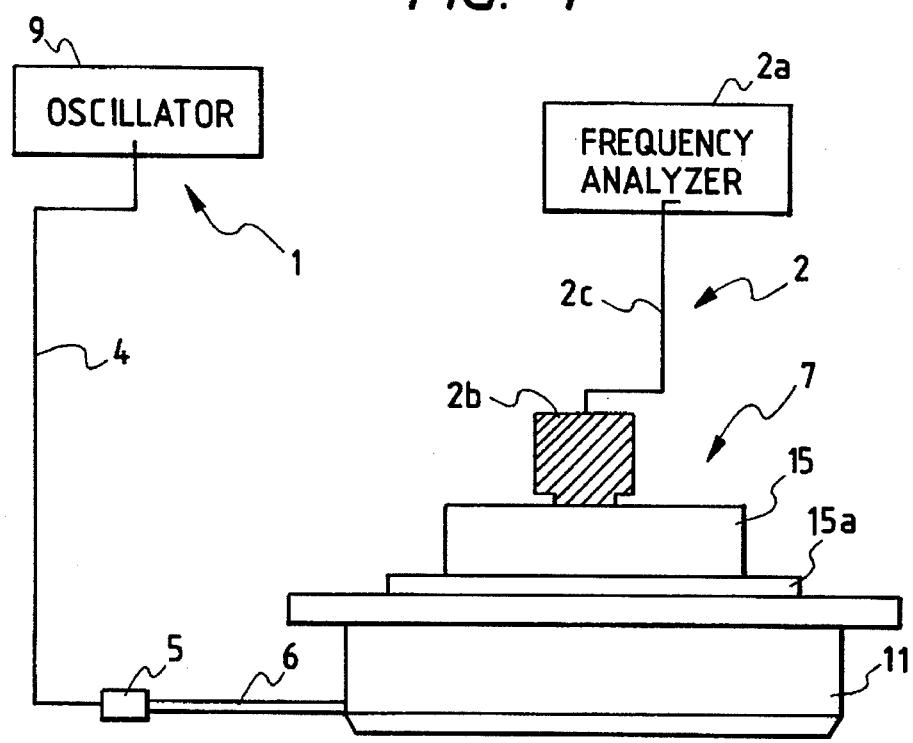
FIG. 1 is a cross sectional view showing a first embodiment of a method of measuring a natural frequency of a motor according to the present invention.

Moreover, the pressure member 24 is formed with a flange 24a having a larger external diameter than that of the pressure member 24, as shown in FIG. 1.

A coil spring 25 is sandwiched in a compressed state between the flange 24a and a knob 22a formed at the rear end portion (or the shown lower end portion) of the body drum 22 so as to apply a pre-pressure of a predetermined level to the ball bearings.

For the application of the pre-pressure, the knob 22a of the body drum 22 is turned at first to screw the (externally) threaded portion 23 into the (internally) threaded bore 20 which is formed in the lower end of the shaft 15a to act as the engagement portion. This turning action is continued until the root (or end face) of the threaded portion 23 comes into abutment against the end face of the shaft 15a.

At this time, the threaded side end face (or the shown upper end face) of the pressure member 24 of the pre-pressure jig 21 abuts against the inner race 14b of the ball bearing 14 so that the inner race receives the (pre-pressure) force (acting in the axial direction) from the coil spring 25 through the pressure member 24.

After the end face of the shaft 15a and the root (or end face) of the threaded portion 23 have come into abutment, the (axial) (pre-pressure) force of the coil spring 25 is continuously applied to the inner race 14b until the inner race 14b is fixed on the outer circumference of the shaft 15a.

At this time, the (axial) (pre-pressure) force from the coil spring 25 acts on the inner race 13b of the ball bearing 13 so that the pre-pressure is applied to the ball bearing 13. Specifically, the (pre-pressure) force of the coil spring 25 applied to the inner race 14b acts, as indicated by broken lines in FIG. 3, in the order of the inner race 14b (the outer race 14a already fixed on the holder 12)→(the holder 12)→(the outer race 13a already fixed on the holder 12)→the inner race 13b. Here, the adjustment of the pre-pressure force (or level) is determined in terms of the compressed state of the coil spring 25 sandwiched between the flange 24a and the knob 22a.

Let it be assumed that a proper pre-pressure on the ball bearings is achieved if the end face of the pressure member 24 and the end face of the shaft 15a are coextensive, as shown in FIG. 3. Then, a pre-pressure of less dispersion can be applied by any operator if it is confirmed that the end face of the shaft 15a and the root (or end face) of the threaded portion 23 are in abutment.

A method of measuring a natural frequency of the motor according to the present invention will be described with reference to the accompanying drawings.

In an actual motor, a current control circuit is connected to a connector 5, which is connected to the winding in a motor 7. In this instance of the present embodiment, an oscillator 9 is connected thereto by a lead wire 4.

The oscillator 9 allows a current frequency to continuously vary from a preset frequency to another frequency. A frequency analyzing means 2 is mounted on the top surface of a rotor 15. The frequency analyzing means 2 contains an acceleration pick-up 2b, which is connected to a frequency analyzer 2a by a cable 2c. The acceleration pick-up 2b is mounted on the top surface of the rotor case 15.

The motor 7 is vibrated at a preset frequency, which depends on a frequency of a fixed current to a coil winding 18 wound on a stator core 17 shown in FIG. 4, from the oscillator 1 by way of the lead wire 4, connector 5, and a flexible printed circuit board 6. In this case, the current is fed while its frequency is continuously varied from a preset frequency to another. When the motor 7 is vibrated, the acceleration pick-up 2b mounted on the top end of a hub 15 as the rotor case detects the amplitude of a vibration of the motor 7. The frequency analyzer 2a, connected to the acceleration pick-up 2b, measures the amplitudes of a vibration of the motor, which correspond to the varied frequencies.

Of those varied frequencies detected by the frequency analyzer 2a, the frequency having the maximum amplitude indicates the natural frequency of the motor 7 as an object to be detected. A value of the prepressure can be checked on the basis of the natural frequency. More specifically, in a case where the motors 7 of the same type are checked for the natural frequencies thereof, if the natural frequency of a motor is substantially equal to that of a reference motor 7, it is considered that the prepressure to the ball bearings 13 and 14 is proper. If the natural frequency of the motor is lower than that of the reference motor 7, an insufficient prepressure is applied to the bearings 13 and 14, and hence it is considered that the ball bearings suffer from a play.

Figure 2:
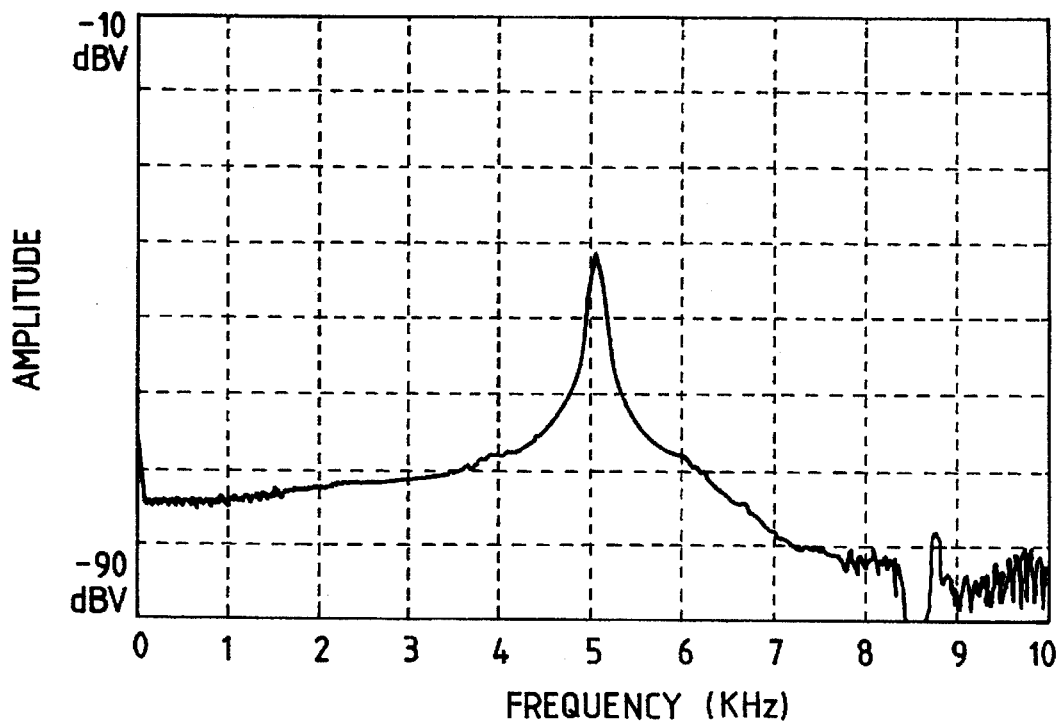
FIG. 2 is a graph showing the frequency vs. amplitude relationship, obtained by the measuring method of the present invention.

A test was conducted. In the test, current was fed to a motor while its frequency was varied in the range from 0 to 10 kHz. The amplitudes of a vibration of the motor were measured. The results of the measurement were plotted as shown in FIG. 2. As seen from the graph, the amplitude of the vibration of the motor is peaked at the frequency near to 5 kHz. The fact that the frequency where the amplitude is peaked is the natural frequency of an object under detection, i.e., the motor, was confirmed. Shifts of the natural frequencies of the measured motors from the reference natural frequency indicate whether or not the prepressure of those motors are proper.

As described above, in the method of measuring the natural frequency of a motor according to the present invention, the motor is vibrated while the frequency of the current fed to the coil of the motor is varied. Accordingly, there is no need of hitting the motor with a hammer or using a vibrator machine. There is eliminated the damage of the motor and/or the ball bearings. The arrangement of the oscillator and the frequency analyzer is simpler than the vibrator machine, leading to cost reduction.

In the above-mentioned embodiment, the measuring method of the present invention is applied to the case where check is made as to whether or not the prepressure applied to the ball bearings is proper. If required, the measuring method may be applied to other cases.

It should be understood that the construction of the motor shown in FIGS. 3 and 4 and the method for applying a prepressure to the ball bearings are illustrated by way of example.

As seen from the foregoing description, in the present invention, a current feed means is connected to an armature coil of a motor. To vibrate the motor, current is fed to the armature coil while the frequency of the current is gradually varied from a preset frequency to another preset frequency. The natural frequency of the motor is measured by a frequency analyzer means brought into contact with the motor. Therefore, there is no need of hitting the motor with a hammer or using a vibrator machine. The motor per se and the like do not suffer from damage. The arrangement of the oscillator and the frequency analyzer is simpler than the vibrator machine, leading to cost reduction, in the present invention, a current feed means is connected to an armature coil of a motor. To vibrate the motor, current is fed to the armature coil while the frequency of the current is gradually varied from a preset frequency to another preset frequency. The natural frequency of the motor is measured by a frequency analyzer means brought into contact with the motor. Therefore, there is no need of hitting the motor with a hammer or using a vibrator machine. The motor per se and the like do not suffer from damage. The arrangement of the oscillator and the frequency analyzer is simpler than the vibrator machine, leading to cost reduction.

What is claimed is:

1. A method of measuring a natural frequency of a motor, comprising the steps of:
    connecting current applying means to an armature coil of the motor;
    applying a current from the current applying means to the armature coil while the frequency of the current is gradually varied from a preset frequency to another preset frequency, to vibrate the motor; and
    measuring the amplitudes corresponding to the frequencies of the current by a frequency analyzer means, which is brought into contact with the motor.

2. A method of measuring a natural frequency of a motor as claimed in claim 1, wherein said motor has a ball bearing and the ball bearing rotatably supports a rotor under a preset prepressure applied thereto.

3. A method of measuring the natural frequency of a motor having a ball bearing as claimed in claim 2, further comprising the step of:
    determining whether said ball bearing preset prepressure is correct by comparing the natural frequency measured by said frequency analyzer means for said motor to the natural frequency measured for a reference motor.

4. A method of measuring the natural frequency of a motor having a ball bearing as claimed in claim 2, wherein said current applying means is an oscillator.

5. A method of measuring a natural frequency of a motor having a ball bearing, comprising the steps of:
    connecting current applying means to an armature coil of the motor;
    applying a current from the current applying means to the armature coil while the frequency of the current is gradually varied from a preset frequency to another preset frequency, to vibrate the motor;
    contacting a frequency analyzer means to an outer surface of said motor for measuring amplitudes corresponding to vibration of said motor; and measuring the amplitudes corresponding to the vibration of the motor which result from the frequencies of the current by said current applying means.

6. A method of measuring the natural frequency of a motor having a ball bearing as claimed in claim 5, further comprising the step of:

determining whether said ball bearing has a correct preset prepressure by comparing the natural frequency measured by said frequency analyzer means for said motor to the natural frequency measured for a reference motor.

7. A method of measuring the natural frequency of a motor having a ball bearing as claimed in claim 6, wherein said step of contacting said frequency analyzer means includes contacting said frequency analyzer means to a rotor of said motor.

8. A method of measuring the natural frequency of a motor having a ball bearing as claimed in claim 7, wherein said step of contacting said frequency analyzer means includes contacting said frequency analyzer means to a hub of said rotor.

9. A method of testing preset prepressure of bearings in a motor, comprising the steps of:

connecting an electric signal oscillating means to an armature coil of the motor;

applying an oscillating current from the electric signal oscillating means to the armature coil while the frequency of the oscillating is gradually varied from a preset frequency to another preset frequency, to thereby vibrate the motor;

contacting a frequency analyzer means to an outer surface of said motor for measuring amplitudes corresponding to vibration of said motor; and analyzing the amplitudes corresponding to the vibration of the motor to determine whether the preset prepressure of the bearings is correct.

10. A method of testing preset prepressure of bearings in a motor as claimed in claim 9, wherein said step of analyzing the amplitudes includes comparing the natural frequency measured by said frequency analyzer means for said motor to the natural frequency measured for a reference motor.

11. A method of testing preset prepressure of bearings in a motor as claimed in claim 9, wherein said step of contacting said frequency analyzer means includes contacting said frequency analyzer means to a rotor of said motor.

12. A method of testing preset prepressure of bearings in a motor as claimed in claim 11, wherein said step of contacting said frequency analyzer means includes contacting said frequency analyzer means to a hub of said rotor.

* * * * *